US007031296B1

(12) United States Patent
Ryals et al.

(10) Patent No.: US 7,031,296 B1
(45) Date of Patent: Apr. 18, 2006

(54) METHOD AND APPARATUS FOR MANAGING THE FLOW OF DATA WITHIN A SWITCHING DEVICE

(75) Inventors: Randy Ryals, Menlo Park, CA (US); Jeffrey Prince, Sunnyvale, CA (US); H. Earl Ferguson, Los Altos, CA (US); Mike K. Noll, San Jose, CA (US); Derek H. Pitcher, Newark, CA (US)

(73) Assignee: Nortel Networks Limited, St. Laurent (CA)

( * ) Notice: Subject to any disclaimer, the term of this patent is extended or adjusted under 35 U.S.C. 154(b) by 71 days.

(21) Appl. No.: 10/330,640

(22) Filed: Dec. 27, 2002

Related U.S. Application Data (63) Continuation of application No. 10/093,290, filed on Mar. 5, 2002, now Pat. No. 6,788,671, which is a continuation of application No. 08/896,485, filed on Jul. 17, 1997, now Pat. No. 6,427,185, which is a continuation of application No. 08/536,099, filed on Sep. 29, 1995, now abandoned.

(51) Int. Cl.
*H04L 12/00* (2006.01)

(52) U.S. Cl. ............... 370/351; 370/355; 370/362; 370/392

(58) Field of Classification Search ........ 711/100, 711/146; 370/351, 355, 359, 362, 392
See application file for complete search history.

(56) References Cited

U.S. PATENT DOCUMENTS 4,975,695 A    12/1990   Almond et al.
5,130,984 A     7/1992   Cisneros
5,195,181 A     3/1993   Bryant et al.
5,214,760 A  *  5/1993   Hammond et al. ........... 710/52
5,386,413 A     1/1995   McAuley et al.
5,394,402 A     2/1995   Ross
5,398,245 A     3/1995   Harriman, Jr.
5,408,469 A     4/1995   Opher et al.

(Continued)

OTHER PUBLICATIONS

Bryant, Stewart F. and Brash, David L.A., "the DECNIS 500/600 Multiprotocol Bridge/Router and Gateway," Digital Technical Journal, vol. 5, No. 1, Winter 1993, pp. 84-98.

(Continued)

*Primary Examiner*—Kenneth R. Coulter
(74) *Attorney, Agent, or Firm*—Blakely Sokoloff Taylor & Zafman, LLP (57) ABSTRACT

A method and apparatus for managing the flow of data within a switching device is provided. The switching device includes network interface cards connected to a common backplane. Each interface card is configured to support the maximum transfer rate of the backplane by maintaining a "pending" queue to track data that has been received but for which the appropriate routing destination has not yet been determined. The switching device includes a switch controller that maintains a central card/port-to-address table. When an interface card receives data with a destination address that is not known to the interface card, the interface card performs a direct memory access over a bus that is separate from the backplane to read routing data directly from the central table in the switch controller. Each interface card builds and maintains a routing information table in its own local memory that only includes routing information for the destination addresses that the interface card is most likely to receive.

62 Claims, 4 Drawing Sheets

U.S. PATENT DOCUMENTS

| | | | |
|---|---|---|---|
| 5,420,858 A | | 5/1995 | Marshall et al. |
| 5,471,472 A | | 11/1995 | McClure et al. |
| 5,483,640 A | * | 1/1996 | Isfeld et al. ............... 709/213 |
| 5,502,719 A | * | 3/1996 | Grant et al. ............... 370/412 |
| 5,524,113 A | | 6/1996 | Gaddis et al. |
| 5,537,395 A | | 7/1996 | Alles et al. |
| 5,555,244 A | | 9/1996 | Gupta et al. |
| 5,588,115 A | | 12/1996 | Augarten |
| 5,592,622 A | * | 1/1997 | Isfeld et al. ............... 709/207 |
| 5,594,734 A | * | 1/1997 | Worsley et al. ........ 370/395.53 |
| 5,732,080 A | | 3/1998 | Ferguson et al. |
| 5,734,656 A | * | 3/1998 | Prince et al. ............... 370/401 |
| 5,737,334 A | * | 4/1998 | Prince et al. .......... 370/395.53 |
| 5,802,278 A | | 9/1998 | Isfeld et al. |
| 5,809,024 A | | 9/1998 | Ferguson et al. |
| 5,852,606 A | | 12/1998 | Prince et al. |
| 5,889,775 A | * | 3/1999 | Sawicz et al. ............ 370/360 |
| 6,216,167 B1 | * | 4/2001 | Momirov ................. 709/238 |
| 6,427,185 B1 | * | 7/2002 | Ryals et al. ............... 711/100 |
| 6,788,671 B1 | | 9/2004 | Ryals et al. |

OTHER PUBLICATIONS

McAuley, Anthony J. and Francis, Paul, "Fast Routing Table Lookup Using CAMs," IEEE Cmputer Society Press, Los Alamitos, CA (1993), pp. 1382-1391.

De Prycker, Martin, "Asynchronous Transfer Mode: Solution for Broadband ISDN," (1991), pp. 55-89, Ellis Horwood Limited, West Sussex, England.

McKeown, Nick; Edell, Richard and Le, My T., "The Bay Bridge: A High Speed Bridge/Router," IFIP PfHSN Workshop, Stockholm, Sweden, May 1992, pp. 1-18.

Jaffe, J.M.; Moss, F.H.; and Weingarten, R.A., "SNA Routing: Past, Present and Possible Future," IBM Systems Journal, vol. 22, No. 4, 1983, pp. 417-434.

Biagioni, Edoardo, et al., "Designing a Practical ATM LAN", IEEE Network, vol. 7, No. 2, (Mar. 1993).

Henrion, M. A., et al., "Switching Network Architecture for ATM Based Broadband Commuications", ISS May 27-Jun. 1, 1990, vol. V., 1-8.

Souza, Robert J., et al., "GIGAswitch System: A High-Performance Packet-Switching Platform", Digital Technical Journal, vol. 6, No. 1, (1994).

Drynan, D. and Ellis, J., "A New Class of Switch for the Multimedia Age," UMI, Inc.; ABI/INFORM, Bell Northern Research Ltd., vol. 28, No. 6; pp. 52-67; ISSN: 00402710, May 1994.

Tannenbaum, A., "Structured Computer Organization," Third Edition, Prentice Hall, Englewood Cliffs, NJ, ISBN 0-13-85466202, 1990, pp. 209-215.

* cited by examiner

METHOD AND APPARATUS FOR MANAGING THE FLOW OF DATA WITHIN A SWITCHING DEVICE

CROSS-REFERENCES TO RELATED APPLICATIONS

This is a continuation of U.S. application Ser. No. 10/093,290 filed Mar. 5, 2002, now U.S. Pat. No. 6,788,671 which is a continuation of U.S. application Ser. No. 08/896,485 filed Jul. 17, 1997, now U.S. Pat. No. 6,427,185, which is a continuation of U.S. application Ser. No. 08/536,099 filed Sep. 29, 1995, now abandoned.

FIELD OF THE INVENTION

The present invention relates to controlling data flow within a switch, and more specifically, to information distribution and buffering mechanisms for controlling data flow between multiple network interfaces over a common backplane.

BACKGROUND OF THE INVENTION

Computer networks consist of a plurality of network devices connected in a way that allows the network devices to communicate with each other. Special purpose computer components, such as hubs, routers, bridges and switches, have been developed to facilitate the process of transporting information between network devices.

Figure 1:
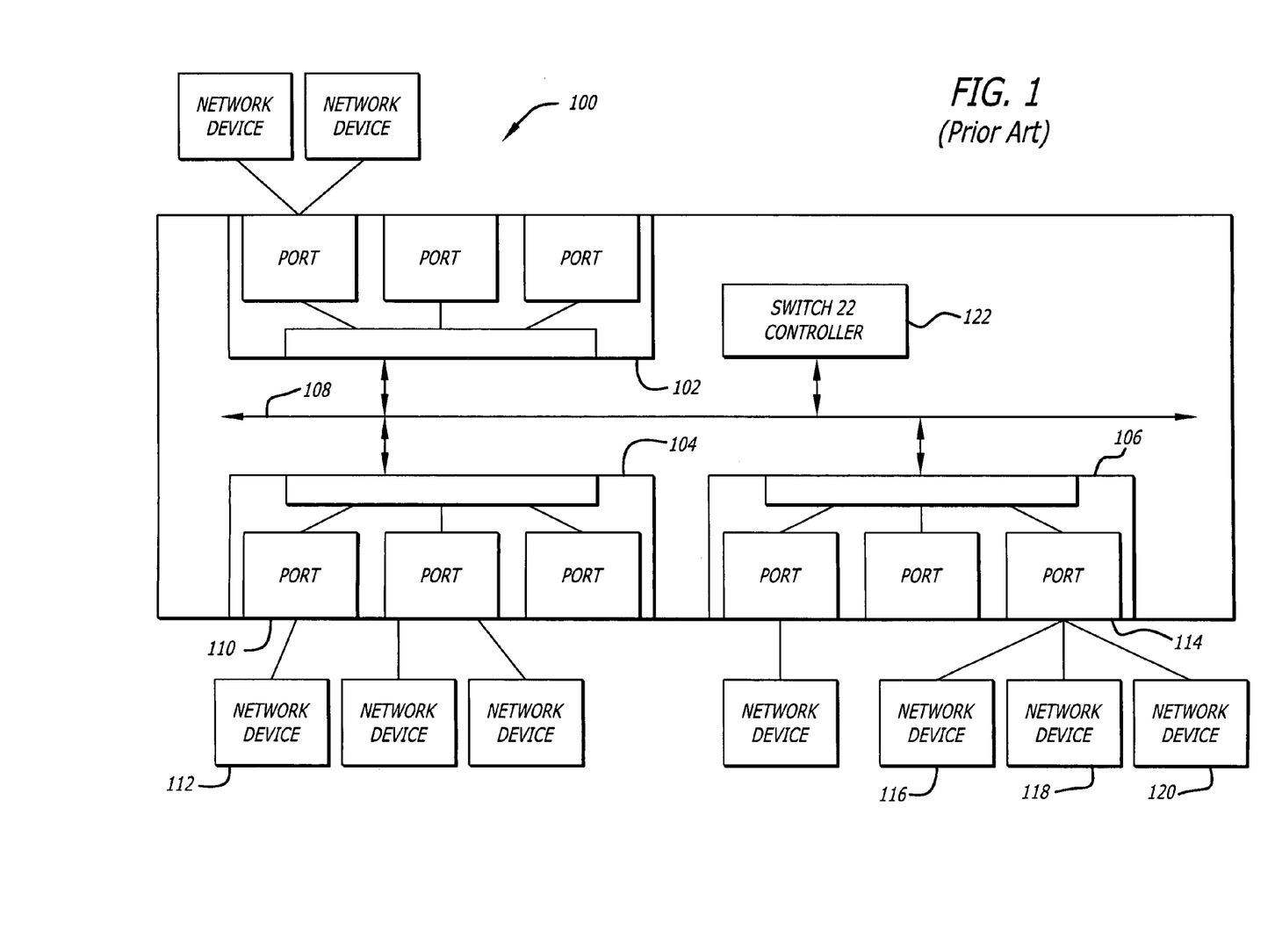
FIG. 1 is a block diagram of a generic switching device.

FIG. 1 is a block diagram of a typical switching device 100. Switching device 100 contains slots for holding network interface cards 102, 104 and 106 and a backplane 108 for transporting information between the various interface cards 102, 104 and 106. The interface cards 102, 104 and 106 have ports that are connected to network devices that are located external to switching device 100. For example, port 110 of interface card 104 is connected to a network device 112. Port 114 of network interface card 106 is connected to network devices 116, 118 and 120.

Before switching device 100 can accurately route data between devices connected to different ports of different cards, switching device 100 must know which devices are connected to which ports. Switching device 100 obtains this knowledge by inspecting the source addresses associated with incoming data.

Typically, incoming data is encapsulated in a structure (e.g. a packet or a cell) that contains both a destination address and a source address. The destination address identifies the device or group of devices to which the data is to be sent. The source address identifies the device from which the data is sent. For the purposes of explanation, the term "cell" shall be used herein to refer to any data structure that contains data and source/destination information, including but not limited to Ethernet packets, ATM cells, and token ring packets.

When an interface card receives a cell that specifies a previously unknown source address, the interface card stores a port-to-address entry in a locally-maintained table. The interface card transmits a message to a central switch controller 122 to notify the switch controller 122 that a device with the specified address is connected to the particular port of the network interface card. Based on the information contained in this message, the switch controller 122 adds a card/port-to-address entry in a centrally-maintained card/port-to-address table. The card/port-to-address entry indicates that the specified port of the interface card that received the cell is connected to a device that has the source address that was specified in the cell. When all interface cards on the switching device 100 report to the switch controller 122 the addresses of the devices to which they are connected in this fashion, the switch controller 122 is able to create and maintain a relatively complete table that maps addresses to ports on controller cards.

As mentioned above, switching device 100 allows network devices connected to the ports of one interface card to communicate with network devices connected to the ports of other interface cards by allowing the network interface cards to transmit information to each other over backplane 108. For example, network device 112 can communicate with network device 116 by transmitting data to interface card 104 in a cell that identifies network device 116 as the desired destination. For the purposes of explanation, it shall be assumed that the address of network device 116 is ADDRX.

Circuitry on the interface card 104 transmits a message over backplane 108 to the switch controller 122 to indicate that the interface card 104 has received a cell with the destination address ADDRX. Switch controller 122 searches for ADDRX in its card/slot-to-address table to determine where interface card 104 should send the cell. In the present example, the card/slot-to-address table in switch controller 122 would contain an entry to indicate that ADDRX is the address of a device connected to port 114 of interface card 106. The switch controller 122 transmits a message containing this information over backplane 108 to interface card 104.

Based on the information contained in the message, interface card 104 routes the cell over the backplane 108 to interface card 106. Interface card 106 receives the cell from backplane 108. Upon receiving the cell, interface card 106 transmits a message over backplane 108 to switch controller 122 to inform switch controller 122 that interface card 106 has received a message with the destination address ADDRX. Switch controller 122 transmits a message over backplane 108 to interface card 106 to inform interface card 106 that address ADDRX is associated with a device connected to port 114 of interface card 106. Based on this information, interface card 106 transmits the cell through port 114 to device 116.

One significant disadvantage of routing cells through switching device 100 in the manner described above is that the messages that are sent between the switch controller 122 and the various interface cards to determine the appropriate routing paths are sent over backplane 108. Consequently, less bandwidth is available for transmitting the actual cells between the interface cards.

A second disadvantage to the switching scheme described above is the amount of time that elapses between when an interface card receives a cell and the time at which the interface card knows where to send the cell. During this time interval, the interface card may receive a whole series of cells for the same destination. To prevent data loss, the interface card would have to include a much larger buffer than would otherwise be required if the interface card could immediately retransmit the cell.

In an alternate approach, the interface card does not wait for the reply from the switch controller 122. Rather, the interface card simply transmits the cells that it does not know how to route to the switch controller 122. The switch controller 122 retransmits the cells to the appropriate destination based on information contained in its table. The switch controller also transmits the appropriate routing information to the interface card so that the interface card will be able to route cells with that destination address in the future.

One disadvantage of this approach is that the same cells are routed over the backplane twice, increasing the amount of traffic on the backplane. A second disadvantage of this approach is that it places a heavy burden on the switch controller, because at any given time every interface card in the switch could be sending cells for the switch controller to reroute.

A third disadvantage is that cells may arrive at their intended destination out of sequence. For example, an interface card may receive a series of cells 1 . . . N for an unknown destination. Initially, the interface card sends the cells to the switch controller. After the interface card has sent M (where 1<M<N) cells to the switch controller, the interface card receives the reply message from the switch controller that indicates how to route the cells. The interface card will then transmit the remaining cells (M+1) . . . N directly to the appropriate card/port. In this scenario, cell M+1 is likely to arrive at the destination card/port prior to cell M, since cell M is sent to the switch controller first.

In another alternative approach, each interface card within switching device 100 can locally store a complete card/port-to-address table. According to this approach, each interface card that detects a new source address will place a message on backplane 108 that indicates the card and slot on which the message with the new source address was received. Each interface card would read the message off the backplane 108 and add the appropriate card/port-to-address entry in its own table. Thus, when an interface card receives a cell, the interface card can quickly determine the appropriate destination for the cell from its own table without having to send or receive messages over the backplane 108. By reducing the messaging traffic over backplane 108, the throughput of switching device 100 is increased. By reducing the delay between receipt of a cell and transmission of the cell, the buffer size within each interface card can be reduced.

An approach in which each interface card maintains a complete card/port-to-address table, such as the approach described above, has the disadvantage that the table may become very large. Each card would have to reserve large amounts of memory to store the table, and contain the control circuitry for managing a large table. Further, each interface card will typically only use a relatively small amount of the data stored in the table. For example, interface card 104 will never need to know the addresses of devices connected to interface card 106 that only communicate with other devices connected to interface card 106.

Figure 2:
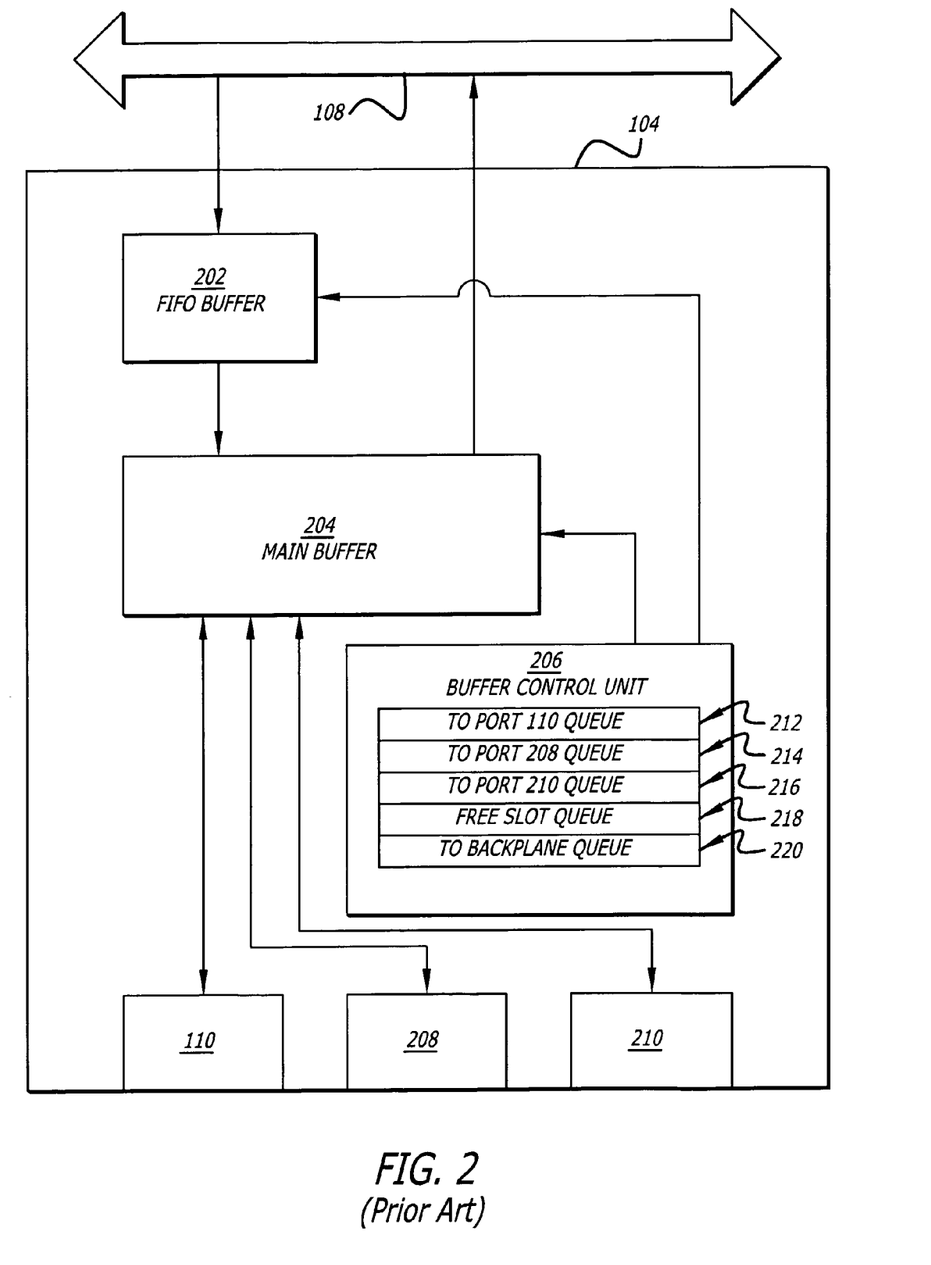
FIG. 2 is a block diagram that illustrates the buffering system used in a prior art network interface card.

Even when a local card/port-to-address table is used by an interface card to determine how to route a cell, there is some interval between the time at which the cell is received by the interface card and the time at which the cell is transmitted by the interface card. During this interval, the cell must be stored somewhere within the interface card. FIG. 2 illustrates a typical buffer mechanism 200 that may be employed by interface card 104 to store cells during this interval.

Referring to FIG. 2, it illustrates the buffering circuitry of interface card 104 of FIG. 1 in greater detail. Interface card 104 includes a first-in-first-out (FIFO) buffer 202, a buffer control unit 206 and a main buffer 204. FIFO buffer 202 is coupled between backplane 108 and main buffer 204. Buffer control unit 206 is coupled to and controls both FIFO buffer 202 and main buffer 204. In addition to port 110, interface card 104 includes ports 208 and 210. Ports 110, 208 and 210 are coupled to main buffer 204.

The main buffer 204 is used to temporarily store both data cells that are to be transmitted out ports 110, 208 and 210, and data cells that are to be transmitted to backplane 108. The main buffer 204 includes a plurality of cell slots, each of which is capable of storing one cell of data.

Buffer control unit 206 maintains a plurality of queues, including one queue (212, 214 and 216) for each of ports 110, 208, and 210, a queue 220 for backplane 108, and a "free slot" queue 218. Buffer control unit 206 stores pointers to the cell slots of main buffer 204 in the various queues. Specifically, each cell slot within main buffer 204 has a unique pointer. The pointer to each cell slot of main buffer 204 is stored in the queue that corresponds to the destination of the data that is currently stored within the cell slot. For example, if a cell slot currently stores data to be sent on the backplane 108, then the pointer to the cell slot is stored in the queue 220 that corresponds to the backplane.

When interface card 104 receives a cell, the interface card 104 must determine the destination of the cell, as described above. Once the destination of the cell has been determined, buffer control unit 206 causes the cell to be stored in main buffer 204 and updates the queues to reflect that the cell is to be sent to the appropriate destination.

Specifically, when a cell is to be sent out a port, the pointer to the cell slot in which the cell resides is placed in the queue associated with the port. When a cell is to be transmitted over the backplane 108, the buffer control unit 206 places the pointer to the cell slot in which the cell resides in the queue 220 associated with the backplane 108.

When a cell of data is transmitted by interface card 104, the cell slot that contained the cell no longer contains data to be transmitted. To indicate that the cell slot is now available to store incoming data, the buffer control unit 206 places the pointer to the cell slot in the free slot queue 218. When storing a cell of data in main buffer 204, the buffer control unit 206 pulls a pointer from the free slot queue 218, and uses the cell slot indicated by the pointer to store the cell of data.

At any given moment all of the other interface cards on backplane 108 may be placing cells on backplane 108 that are destined for devices connected to interface card 104. To process the cells without losing data, interface card 104 must be able to sustain, for at least brief periods of time, a backplane-to-card transfer rate equal to the maximum transfer rate supported by backplane 108 (e.g. 3.2 gigabytes per second).

Typically, buffer control unit 206 determines the appropriate destination for cells at a rate (e.g. 1.2 gigabytes per second) that is slower than the maximum transfer rate of the backplane 108. Therefore, to sustain brief periods in which cells arrive at the high transfer rate of the backplane 108, the information contained on backplane 108 is transferred from the backplane 108 into the high speed FIFO buffer 202 of interface card 104. During the interval in which a cell is stored in FIFO buffer 202, interface card 104 determines the destination of the cell. Once the destination of the cell has been determined, buffer control unit 206 removes the cell from FIFO buffer 202 and stores the cell in the main buffer 204.

The buffering system illustrated in FIG. 2 has the significant disadvantage that high speed FIFO buffers are expensive. Further, every interface card in the switch must have its own FIFO buffer to support the maximum transfer rate of the backplane. Consequently, the increased cost of high speed FIFO buffers is incurred for every interface card in the switch.

Based on the foregoing, it is clearly desirable to provide a switching device in which the delay between when an interface card receives a cell and the time at which the interface card transmits the cell is reduced. It is further desirable to provide a switching device in which the amount of traffic on the backplane that is used to determine how to route cells is reduced. Further, it is desirable to reduce the size and complexity of tables that are maintained locally in interface cards. In addition, it is desirable to provide a buffering system that allows interface cards to receive data off the backplane at the backplane's maximum transfer rate without requiring the use of high speed FIFO buffers.

SUMMARY OF THE INVENTION

A method and apparatus for managing the flow of data within a switching device is provided. The switching device includes network interface cards connected to a common backplane. Each interface card is configured to support the maximum transfer rate of the backplane by maintaining a "pending" queue to track data that has been received but for which the appropriate destination has not yet been determined. The switching device includes a switch controller that maintains a central card/port-to-address table. When an interface card receives data with a destination address that is not known to the interface card, the interface card performs a direct memory access over a bus that is separate from the backplane to read routing data directly from the central table in the switch controller. Each interface card builds and maintains a routing information table in its own local memory that only includes routing information for the destination addresses that the interface card is most likely to receive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Improved Buffer Mechanism

Figure 3:
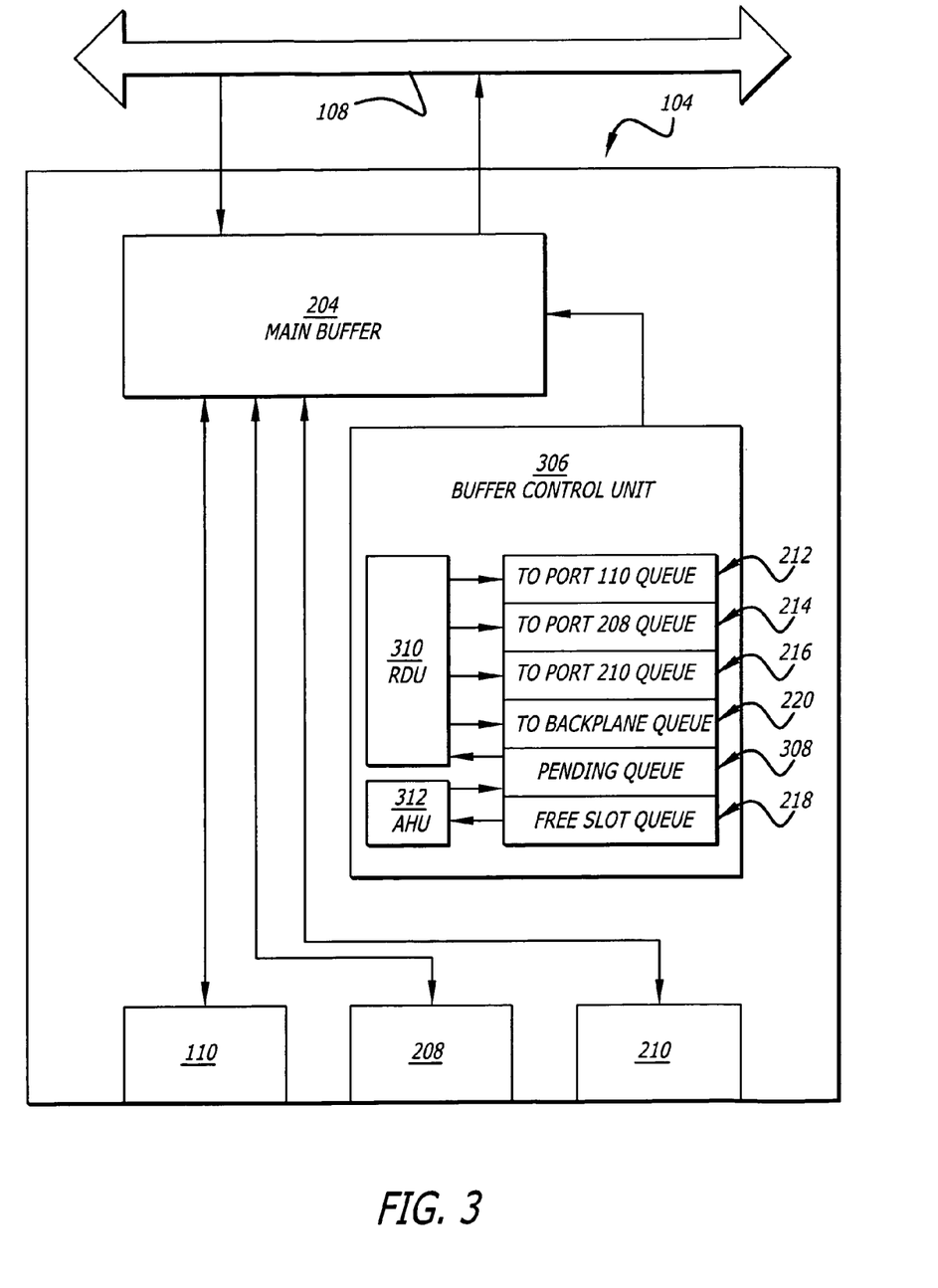
FIG. 3 is a block diagram that illustrates a buffering system according to an embodiment of the present invention.

Referring to FIG. 3, it illustrates the interface card 104 of FIG. 2 with a buffer control unit 306 according to an embodiment of the present invention. Similar to the buffering mechanism illustrated in FIG. 2, buffer control unit 306 includes a plurality of queues, including queues 212, 214, and 216 that correspond to ports 110, 208 and 210, a queue 220 that corresponds to the backplane 108, and a free slot queue 218. In addition, buffer control unit 306 includes a pending queue 308. As shall be described hereafter, buffer control unit 306 uses pending queue 308 in a way that allows buffer control unit 306 to transfer cells off the backplane 108 directly into main buffer 204 at the maximum transfer rate of the backplane 108. Consequently, the need for a high speed FIFO buffer is eliminated.

When interface card 104 detects a cell on backplane 108 that is destined for interface card 104, an arrival handling unit (AHU) 312 within buffer control unit 306 pulls the pointer from the head of free slot queue 218 and places the cell directly in the cell slot that corresponds to the pointer. Ideally, the arrival handling unit 312 would then attach the pointer to the tail of the queue that corresponds to the destination of the cell. However, as mentioned above, there is not enough time to determine the destination of a cell before arrival handling unit 312 must be available to handle the arrival of a subsequent cell.

Rather than immediately determine the destination of the cell as it is stored in main buffer 204, arrival handling unit 312 simply snoops the destination address from the cell and places into the pending queue 308 both the destination address and the pointer to the cell slot into which the cell was placed. Because no destination determination is performed during this process, arrival handling unit 312 is able to place cells into main buffer 204 at the maximum transfer rate of backplane 108.

Buffer control unit 306 includes a route determination unit (RDU) 310 that sequentially removes entries from the head of the pending queue 308 and determines where cells that have the destination address contained in the entries should be routed. When route determination unit 310 determines the proper route for the destination address contained in an entry, the pointer in the entry is placed in the queue that corresponds to the determined route.

Typically, the route determination unit 310 will not be able to determine the route that corresponds to a destination address in the amount of time that it takes for a subsequent cell to arrive on backplane 108. Consequently, when cells for interface card 104 are arriving on backplane 108 at the maximum transfer rate of backplane 108, the size of the pending queue will increase. However, in typical applications, there will also be periods of relatively low cell arrival rates. During these periods, route determination unit 310 will be removing entries from pending queue 308 faster than the arrival handling unit 312 is adding entries to the pending queue 308.

According to one embodiment, buffer control unit 306 is implemented in an application specific integrated circuit (ASIC). However, many alternative implementations are possible. For example, the destination determination unit 310 and the arrival handling unit 312 may be implemented by separate hardwired circuitry, or by programming one or more processors to perform the described functions. The present invention is not limited to any particular implementation of buffer control unit 306.

Route Determination Mechanism

The mechanism used by route determination unit 310 to determine the proper route for cells based on the destination address contained within the cells significantly affects the cost and efficiency of the switching device in which buffer control unit 306 is used. As mentioned above, interface cards can determine this information by communicating over the backplane 108 with a switch controller 122 that contains a central card/port-to-address table, or by each maintaining their own card/port-to-address table. However, each of these options has significant disadvantages. The approach in which cards send messages to request the required information from the switch controller 122 is relatively slow and uses valuable bandwidth on the backplane. The approach in which each interface card maintains its own complete table requires each card to dedicate a relatively large amount of resources for creating and maintaining the table.

Figure 4:
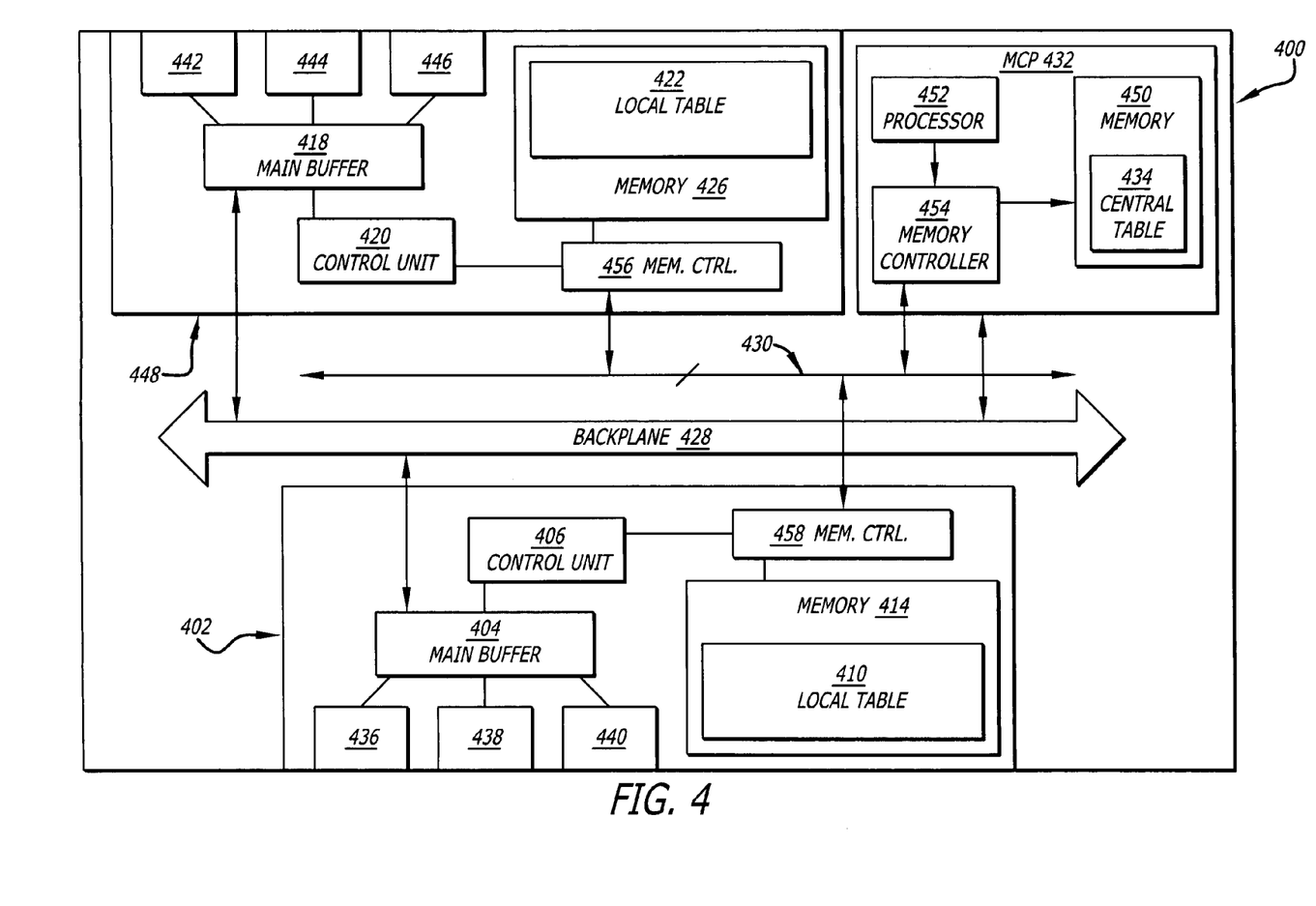
FIG. 4 is a block diagram that illustrates a switching device in which destination address is distributed to local tables using direct memory access techniques according to an embodiment of the invention.

Referring to FIG. 4, it illustrates a switching device 400 configured according to one embodiment of the invention. Switching device 400 includes a backplane 428, two interface cards 448 and 402, and a master control process (MCP) 432. Master control process 432 includes memory 450, a memory controller 454, and a processor 452. For the purposes of explanation, the master control process 432 is illustrated as an independent component of switching device 400. However, the master control process 432 may actually reside on one of the network interface cards in switching device 400.

Each of the interface cards 402 and 448 includes a plurality of ports, a main buffer, a control unit, a memory controller and a local memory. Specifically, interface card 448 includes three ports 442, 444 and 446, main buffer 418, control unit 420, memory controller 456 and memory 426. Interface card 402 includes three ports 436, 438 and 440, a main buffer 404, control unit 406, memory controller 458 and memory 414. The control units 420 and 406 generally represent control circuitry which performs various control functions, including the functions described above with respect to buffer control units. Control units 420 and 406 may be implemented using hard-wired circuitry, a programmed processor, or a combination of hard-wired and programmed circuitry.

In addition to backplane 428, switching device 400 includes a bus 430. Bus 430 is a multiple-line bus (e.g. 16 lines) that interconnects the memory controllers on all of the interface cards and on the memory controller in the master control process 432. Bus 430 is separate from the path of the normal data flow within switching device 400, which occurs over backplane 428. Consequently, the presence of signals on bus 430 has no effect on the overall data flow over backplane 428.

Combined Memory Space

Each of memories 426, 450 and 414 is assigned an address space that does not overlap with the address space assigned to any other of the memory devices within switching device 400. For example, memories 426, 450 and 414 may be respectively assigned the address spaces 0 to N, (N+1)+M, and (M+1) to L. The address space covered by all of the memories 426, 450 and 414 (e.g. 0 to L) is referred to herein as the combined address space.

Each of memory controllers 454, 456, and 458 is able to directly perform memory transactions on data stored anywhere within the combined address space. An operation that is to be performed on data that is stored in memory that is not local (with respect to the memory controller that will perform the operation) is performed over bus 430. Bus 430 may be, for example, a multiplexed channel in which a memory controller places an address on the bus 430 during the first half of a clock cycle, and the memory that includes the memory location specified in the address places the data that resides in the memory location on the bus 430 during the second half of a clock cycle.

Because each memory controller is able to perform transfer operations on any data stored within the combined address space, the control units 406 and 420 and processor 452 are able to request memory operations to be performed on any data in the combined address space, regardless of the location of the memory that contains the data involved in the operation. Further, according to one embodiment of the invention, each control unit is completely unaware of the address boundaries between the various memory devices. The fact that some of the transfer operations are taking place over bus 430 is completely transparent to the control units 420, 406 and processor 452.

For example, control unit 406 may request data to be copied from a first memory location to a second memory location. The control unit 406 is completely unaware of where the memory device(s) that correspond to the first and second memory locations actually reside. For the purposes of explanation, it shall be assumed that the first memory location resides in the address space of memory 426, while the second memory location resides in the address space of memory 414.

To perform the requested operation, control unit 406 simply requests memory controller 458 to perform the memory transfer. Memory controller 458 retrieves data from the first location by reading the data from the appropriate memory location in memory 426 over bus 430. Memory controller 458 then stores the data at the appropriate location in memory 414.

Direct Access of the Central Table

According to one embodiment of the invention, the central card/port-to-address table 434 is stored in the memory 450 of the master control process 432. The location at which each entry is stored in the table 434 is determined by performing a hash function on the address associated with the entry. The hash function may consist of extracting the lower N bits from the address, for example. Collisions may be resolved by any one of numerous collision resolution techniques. The present invention is not limited to any particular hash function or collision resolution technique.

When an interface card receives a cell, the control unit on the interface card reads the destination address from the cell and performs the hash function on the destination address. The result of the hash function is used as an index into central table 434. The control unit transmits control signals to the memory controller associated with the control unit, causing the memory controller to retrieve data from the memory location that corresponds to the index. The memory controller performs the transfer operation over bus 430. The control unit uses the retrieved information to determine where to transmit the received cell.

As mentioned above, one disadvantage of the prior art approach to having a single card/port-to-address table is that the messages required to transfer the appropriate routing data from the master control process 432 to the various interface cards create traffic over backplane 428 that reduces the bandwidth available for card-to-card cell transfers. A second disadvantage is the amount of time required to generate the request and reply messages.

However, the embodiment illustrated in FIG. 4, which uses a separate bus 430 that allows each interface card to directly access the entire combined memory, overcomes both of these disadvantages. Specifically, data transfers occur over a bus 430 that is separate from the backplane 428, so no backplane traffic is generated.

In addition, the direct memory accesses performed over bus 430 are only slightly slower than local memory accesses. Therefore, the time delay between the arrival of a cell and the time at which the appropriate routing for the cell is determined is significantly reduced. In the preferred embodiment, the entire routing determination operation is completed for each cell by the time the interface card must being to process the subsequent cell.

Additional advantages are derived by allowing each interface card to directly address the combined address space of switching device 400. For example, the combined address space includes the memory address of each of the ports on each of the interface cards. Consequently, an interface card can write to the address associated with the port on another card to send data directly out the port that corresponds to the address. Thus, one card can cause data to be sent directly out the port of another card without involving the control circuitry of the other card.

Local Tables

The embodiment described above overcomes many of the disadvantages of the prior art. However, the numerous memory accesses that would be performed over bus 430 in a switching device that has a large number of interface cards may exceed the throughput of bus 430. Further, if the central table 434 became corrupted or MCP 432 ceased to function properly, the entire switching device 400 would cease to function.

To resolve these problems, the interface cards are configured to store in their local memories the portions of the central table 434 in which they are most interested. According to one embodiment, each interface card maintains its own local table. In the illustrated embodiment, interface card 402 includes a local table 410 stored in memory 414. Interface card 448 includes a local table 422 stored in memory 426. Initially, these tables are empty.

Interface cards add entries to their local tables only as needed. For example, assume that interface card 402 receives a cell. The cell is stored in a cell slot of main buffer 404. An entry containing (1) the pointer to the cell slot and (2) the destination address contained in the cell is placed on the pending queue (not shown) of the control unit 406 as shown in detail in FIG. 3. When the entry is at the head of the pending queue, the control unit 406 does not immediately invoke a memory operation to retrieve information from the central table 434 in MCP 432. Rather, control unit 406 inspects the local table 410 to determine whether an entry associated with the destination address resides in the table 410. If the local table contains an entry associated with the destination address, then the appropriate routing for the packet is determined based on the information in the entry, and the pointer to the cell slot is placed in the appropriate queue(s).

If the local table 410 does not contain an entry associated with the destination address contained within the cell, then the control unit 406 causes information from the appropriate entry of the central table 434 to be retrieved over bus 430 through a direct memory access operation, as described above. The entry from the central table 434 identifies the card and/or port to which the received cell is to be transmitted. Based on this information, the control unit 406 places the pointer to the cell slot in which the cell resides in the appropriate queue.

In addition to placing the pointer in the appropriate queue, control unit 406 generates an entry for table 410 based on the information retrieved from central table 434. The information stored in the local table 410 includes information that indicates to where cells that contain the destination address in question should be routed. Therefore, when interface card 402 receives cells with the same destination address in the future, control unit 406 will be able to determine the appropriate routing of the cells without having to access the central table 434 stored in the MCP 432.

The destination tag is a tag that indicates the card(s) and port(s) to which cells with the particular address are to be routed. According to one embodiment of the invention, the destination tag is a "destination tag", an each interface card is configured with a mechanism to route cells to the appropriate cards and ports based on the destination tag. A system that employs destination tags to route packets between interface cards connected to a common backplane is described in U.S. patent application Ser. No. 08/501,483 entitled METHOD AND APPARATUS FOR CONTROLLING DATA FLOW WITHIN A SWITCHING DEVICE that was filed on Jul. 12, 1995 by Ferguson, the contents of which are incorporated herein by reference as described below:

MCP 104 uses Dtags to control the distribution of data within and between each of the cards in device 100, and between ports on each of the cards. In the preferred embodiment, Dtags are twelve bit values. By convention, the four high order bits for Dtags used for point-to-point forwarding are zero. The second four bits in a point-to-point Dtag specify the destination card and the low order four bits specify the destination port on the specified destination card. The Dtags for point-to-point forwarding are pre-allocated upon the initialization of switch device 100. This convention is arbitrary. In some embodiments it may simplify recognition of the direct single port Dtags.

For operations in which data is sent to multiple ports (multi-cast operations), at least one of the first four bits is non-zero. These multi-cast Dtags and their associated table entries are allocated after initialization as needed to represent the virtual architecture of the switching device 100. In the preferred embodiment, special Dtags are also allocated for transmitting messages to MCP 104.

The address information contained in an entry is information that allows an interface card to determine the full address that corresponds to the entry. For example, in a system where a portion of the full address is used as an index to the entry, the entry may contain the portion of the address that was not used as the index. The full address associated with an entry may therefore be determined based on the location of the entry within the local table and the portion of the address that is contained within the entry. It may be important to be able to determine the full address associated with an entry in order to resolve collisions when two addresses hash to the same index.

The collision pointer is index that points to the memory location of an entry that collided with the current entry. If no collision has occurred, then the collision pointer is NULL. The "identical address" flag indicates whether the destination address that corresponds to this entry is identical to the destination address that corresponds to another entry.

The aging information indicates how much time has elapsed from the transmission of the last packet destined to the address. According to one embodiment, the control unit on a card uses the aging information to delete entries that correspond to addresses that have not been used for longer than some specified amount of time. By deleting entries that correspond to addresses that have not been used for some period of time, the size of the local table is kept to a minimum. If a packet with an address that corresponds to an entry arrives after the entry has been deleted, the interface card must again read information from the central table 434 to recreate the entry in the local table.

In the worst case scenario, the operations involved in determining the destination for a cell include accessing local tables, calculating a memory location, performing a direct memory access to retrieve data from the memory location, and updating local tables. None of these operations require the involvement of off-card processors or control units, nor do they generate any traffic over the backplane. Consequently, even in the worst case, an interface card is able to determine the appropriate routing of a cell prior to the time at which the interface card must begin to process a subsequent cell.

The local table within any given interface card will typically only contain a relatively small portion of the information stored in the central table 434. Consequently, the amount of resources required in each interface card to create and maintain the tables is relatively small. Further, the information contained in the local memory of an interface card will be the most relevant information for that particular interface card.

Using the techniques described above, each interface card gradually builds its own local table. If an interface card has already received a cell for a particular destination, then the interface card will not have to perform memory accesses over bus 430 to process subsequent cells for the same destination. Rather, the interface card will already have stored enough information locally to determine where to send the cell without need for further interaction with the master control process 432. As a result, the amount of traffic over bus 430 is significantly reduced.

A second advantage of storing local tables within each interface card is that the failure of any one component in switching device 400 will not cause the entire switching device 400 to fail. For example, if MCP 432 ceases to function properly, then the interface cards may not be able to retrieve destination address from the central table 434. However, the interface cards will be able to continue to process cells for destinations for which the interface cards have previously received cells.

According to one embodiment, an interface card may access the local tables in other interface cards when the MCP 432 ceases to function. These accesses are performed through the same direct memory access process that interface cards use to read the entries from the central table 434. When an interface card finds an entry that corresponds to a particular address in the local table of another card, the interface card copies information from the entry into its own table, just as it does when retrieving information from the central table 434.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. An apparatus to store a destination tag associated with a received packet that specifies routing of the packet over a switching device including a backplane, a bus, a master control process adapted for coupling to both the backplane and the bus and including a memory to store routing information, and a plurality of interface cards, the apparatus comprising:
a first entry to store a first field of the destination tag, the first field to specify whether or not the packet is to undergo a multicast operation by routing the packet to at least two ports of the plurality of interface cards; and
a second entry to store a second field of the destination tag, the second field to specify a port on one of the plurality of interface cards to receive the packet when the first field specifies that the packet is not to undergo the multicast operation.

2. The apparatus of claim 1, wherein the second field of the second entry includes an encoded value to specify at least the port on the one of the plurality of interface cards.

3. A switching device comprising:
a backplane;
a bus;
a master control process coupled to the backplane and the bus, the master control process including a memory to store routing information; and
a plurality of interface cards including a first interface card that comprises a local memory to store a portion of the routing information already stored in the memory of the master control process upon receiving a packet that includes a destination address about which no routing information is currently stored, the portion of the routing information including a destination tag including a multicast field and a port field that specifies a destination port associated with one of the plurality of interface cards for receipt of information associated with the packet when the multicast field specifies that the packet is being routed in accordance with a unicast transmission.

4. A switching device comprising:
a backplane;
a bus;
a master control process coupled to the backplane and the bus, the master control process including a memory to store routing information; and
a plurality of interface cards coupled to the backplane and the bus, at least a first interface card of the plurality of interface cards comprises a local memory to store a portion of the routing information already stored in the memory of the master control process upon receiving a packet that includes a destination address about which no routing information is currently stored, the portion of the routing information including a destination tag to identify whether or not the packet is routed to a destination port associated with one of the plurality of interface cards.

5. The switching device of claim 4, wherein the destination tag comprises a port field including a plurality of bits to specify the destination port.

6. The switching device of claim 5, wherein the plurality of bits specify the destination port as being a port associated with a second interface card of the plurality of interface cards, the second interface card being different from the first interface card.

7. The switching device of claim 5, wherein the destination tag further comprises a multicast field including at least one bit to enable multicast routing of the packet.

8. The switching device of claim 7, wherein the plurality of bits of the port field are used for a multicast transmission of the packet in lieu of specifying the destination port for the packet when the multicast field contains a first value.

9. The switching device of claim 7, wherein the packet is to be routed to at least two ports associated with the plurality of interface cards when the multicast field of the destination tag has a first value.

10. The switching device of claim 9, wherein the first value includes at least one bit of the multicast field being non-zero.

11. The switching device of claim 8, wherein the first value includes at least one bit of the multicast field being non-zero.

12. The switching device of claim 8, wherein the plurality of bits of the port field are used for a point-to-point forwarding of the packet when the multicast field of the destination tag has a second value.

13. The switching device of claim 12, wherein the second value includes each bit of the multicast field having a same value.

14. The switching device of claim 4, wherein the bus is a multiple line bus coupled to a memory controller implemented within each of the plurality of interface cards.

15. The switching device of claim 4, wherein an address space of the memory of the master control process is non-overlapping with address spaces of each of the local memories of the plurality of interface cards.

16. The switching device of claim 15, wherein the address spaces of each of the local memories of the plurality of interface cards are non-overlapping with each other.

17. The switching device of claim 14, wherein the first interface card further comprises a control unit coupled to the memory controller, the control unit comprises a buffer and a queue that is used by the control unit to transfer packets, inclusive of the packet, off the backplane into the buffer at a maximum transfer rate of the backplane.

18. The switching device of claim 17, wherein the first interface card further comprises an arrival handling unit coupled to the queue, the arrival handling unit to snoop destination addresses for each of the packets and, for the packet, to place into the queue (i) the destination address from the packet and a pointer to a slot within the buffer into which the packet is placed.

19. The switching device of claim 18, wherein the packet is of a variable length.

20. The switching device of claim 19, wherein the packet is an Ethernet packet.

21. Implemented within a switching device including a backplane, a bus, a master control process adapted for coupling to the backplane and the bus and including a memory to store routing information and a plurality of interface cards, a first interface card of the plurality of interface cards comprising:
   a memory controller coupled to the bus; and
   a local memory to store therein a destination tag for specifying a destination of an incoming packet received by the first interface card, the destination tag comprises;
   a multicast field to enable a multicast transfer of the packet to multiple ports on the plurality of interface cards, and
   a port field to enable point-to-point forwarding of the packet when the multicast transfer is not being performed by the first interface card, the port field specifying a first port of at least one of the plurality of interface cards.

22. The first interface card of claim 21, wherein the local memory of the first interface card further stores a portion of the routing information already stored in the memory of the master control process upon receiving the packet that includes a destination address about which no routing information is currently stored, the portion of the routing information including the destination tag.

23. The first interface card of claim 22, wherein the port field of the destination tag comprises a plurality of bits to specify the first port.

24. The first interface card of claim 22, wherein the multicast field of the destination tag comprises at least one bit to control the multicast transfer of the packet in lieu of point-to-point forwarding.

25. The first interface card of claim 21, wherein the packet is routed to at least two ports associated with the plurality of interface cards when the multicast field of the destination tag is set to a first value.

26. The first interface card of claim 25, wherein the first value is represented by at least one bit of the multicast field of the destination tag being non-zero.

27. The first interface card of claim 21, wherein the packet is routed to the first port during the point-to-point forwarding when the multicast field of the destination tag has a first value.

28. The first interface card of claim 27, wherein the first value is represented by each bit of the multicast field of the destination tag being zero.

29. The first interface card of claim 27, wherein the first value is represented by each bit of the multicast field of the destination tag being a same value.

30. The first interface card of claim 21, wherein the destination tag is retrieved based on at least a portion of a destination address of the packet.

31. The first interface card of claim 21, wherein the destination tag is obtained by performing a hashing operation on a destination address of the packet to produce a result, the result being used as an index for a table within the memory of the master control process.

32. The first interface card of claim 31, wherein the destination tag is moved over the bus between the memory controller and the master control process.

33. The first interface card of claim 21, wherein the memory controller retrieves the destination tag over the bus from a table within the memory of the master control process.

34. A switching device comprising:
   a backplane;
   a bus;
   a master control process coupled to the backplane and the bus, the master control process including a memory to store routing information; and
   a plurality of interface cards coupled to the backplane and the bus, at least a first interface card of the plurality of interface cards comprises a local memory to store a portion of the routing information already stored in the memory of the master control process upon receiving a packet that includes a destination address about which no routing information is currently stored, the portion of the routing information including a destination tag that comprises at least a multicast field to indicate whether or not the packet is to be routed to at least two ports on the plurality of interface cards.

35. The switching device of claim 34, wherein the bus enables the portion of the routing information to be loaded into the local memory from the master control process.

36. The switching device of claim 34, wherein the backplane enables the packet to be routed to a port on a second interface card of the plurality of interface cards, the second interface card being physically separate from the first interface card.

37. The switching device of claim 35, wherein the backplane enables the packet, based on information within the destination tag, to be routed to one or more selected ports on the plurality of interface cards.

38. The switching device of claim 34, wherein the destination tag further comprises a port field being a plurality of bits to specify a port to receive the packet when the multicast field is set to a predetermined value.

39. The switching device of claim 38, wherein the predetermined value is represented by each bit of the multicast field being zero.

40. The switching device of claim 38, wherein the predetermined value is represented by a substantial majority of bits of the multicast field having a same value.

41. The switching device of claim 34, wherein the bus is a multiple line bus coupling a memory controller implemented within each of the plurality of interface cards.

42. The switching device of claim 41, wherein an address space of the memory of the master control process is non-overlapping with address spaces of each of the local memories of the plurality of interface cards.

43. The switching device of claim 42, wherein the address spaces of each of the local memories of the plurality of interface cards are non-overlapping with each other.

44. A method for routing data over a switching device including (i) a backplane, (ii) a bus, (iii) a master control process adapted for coupling to the backplane and the bus and including a central table to store routing information, and (iv) a plurality of interface cards, the method comprising:
determining whether or not an entry associated with a destination address contained in an incoming cell resides in a local table contained in a memory of a first interface card of the plurality of interface cards;
if the local table does not contain the entry associated with the destination address, moving a portion of the routing information from an entry associated with the destination address residing in the central table over the bus;
loading the portion of the routing information within an entry of the local table; and
using the portion of the routing information to route the cell to at least one port on the plurality of interface cards.

45. The method of claim 44, wherein the cell is any data structure containing data and a destination address.

46. The method of claim 44, wherein the cell is a packet including data and the destination address.

47. The method of claim 46, wherein the packet is a token ring packet.

48. The method of claim 46, wherein the determining whether or not the entry associated with the destination address contained in the incoming cell resides in the local table comprises:
receiving the cell;
reading the destination address from the cell;
performing a hash function on the destination address to produce an index; and
determining whether or not the local table includes an entry associated with the index.

49. The method of claim 46, wherein the determining whether or not the entry associated with the destination address contained in the incoming cell resides in the local table comprises:
receiving the cell;
storing the cell within a cell slot of a buffer of the first interface card;
placing a pointer to the cell slot and the destination address into an entry of a queue accessed by a control unit of the first interface card; and
inspecting the local table by the control unit when the entry is at a head of the queue to determine whether or not the local table includes an entry associated with the destination address.

50. The method of claim 46, wherein the moving of the portion of the routing information comprises performing a direct memory access operation by a control unit of the first interface card.

51. The method of claim 46, wherein the portion of the routing information comprises a destination tag to control forwarding of the packet.

52. The method of claim 51, wherein the destination tag comprises a port field being a plurality of bits that specify a destination port for the packet.

53. The method of claim 51, wherein the destination tag comprises a multicast field including at least one bit to enable multicast routing of the packet.

54. The method of claim 53, wherein the destination tag further comprises a port field including a plurality of bits that specify a destination port on one of the plurality of interface cards for forwarding of the packet when the multicast field is set to a first value.

55. The method of claim 54, wherein the first value is represented by each bit of the multicast field having a same logical value.

56. The method of claim 54, wherein the first value is represented by each bit of the multicast field being zero.

57. The method of claim 53, wherein the packet is routed to at least two ports associated with the plurality of interface cards when the multicast field is set to a first value.

58. The method of claim 57, wherein the first value is represented by the at least one bit of the multicast field being non-zero.

59. The method of claim 51, wherein bits of the destination tag being used to support either a point-to-point forwarding of the packet to a specified port of the plurality of interface cards as specified in the destination tag or a multicast transmission of the packet to multiple ports of the plurality of interface cards.

60. The method of claim 44, wherein the cell is a packet of a variable bit length.

61. The method of claim 60, wherein the packet is an Ethernet packet.

62. The method of claim 44, wherein an address space of a memory of the master control process containing the central table is non-overlapping with an address spaces of the local memory of the first interface card.

* * * * *